Figure 1:
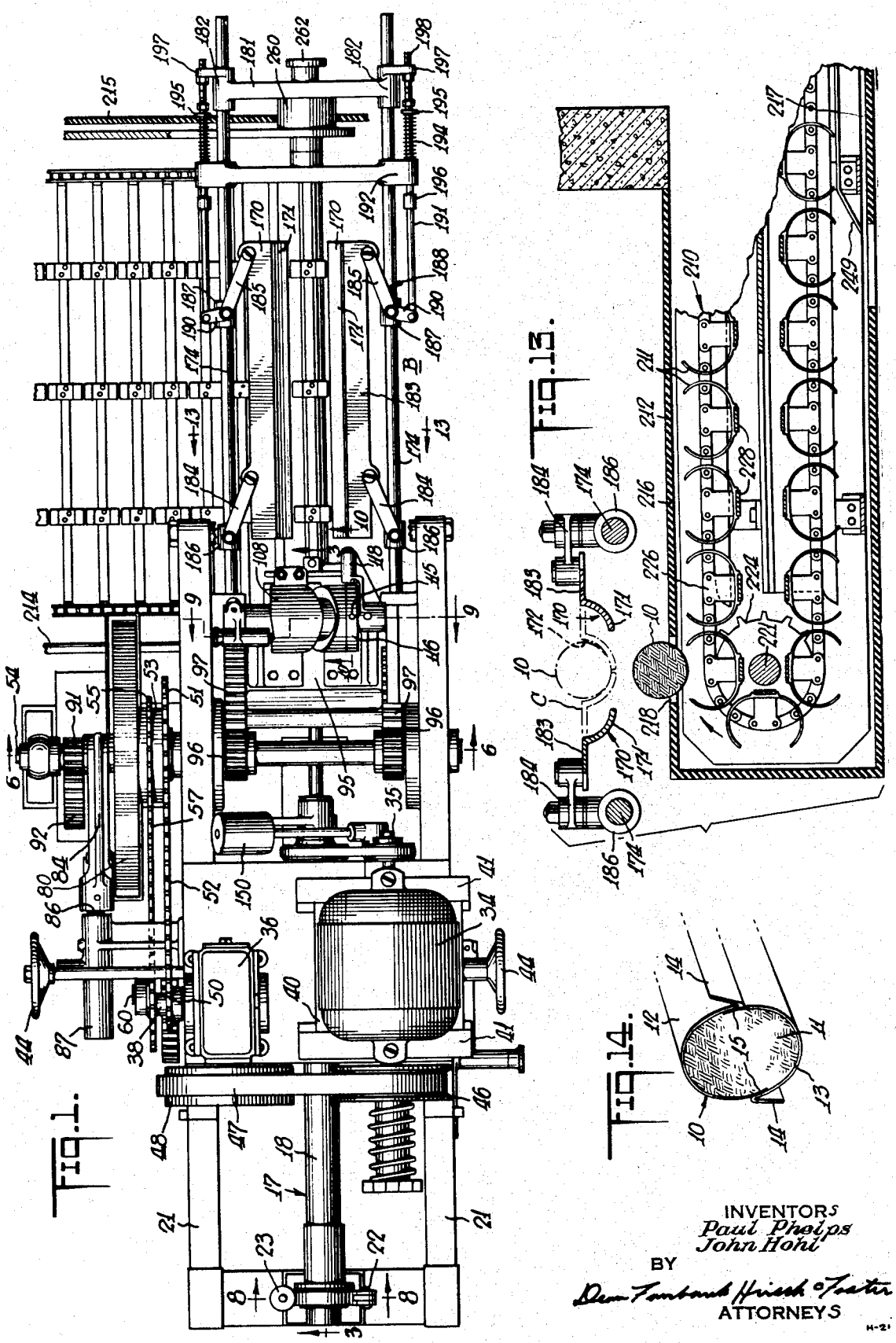

April 18, 1939. P. PHELPS ET AL 2,154,695
TRAVELING CUT-OFF
Filed June 5, 1936 7 Sheets-Sheet 1

INVENTORS
Paul Phelps
John Hohl
BY
ATTORNEYS

April 18, 1939.    P. PHELPS ET AL    2,154,695
TRAVELING CUT-OFF
Filed June 5, 1936    7 Sheets-Sheet 7
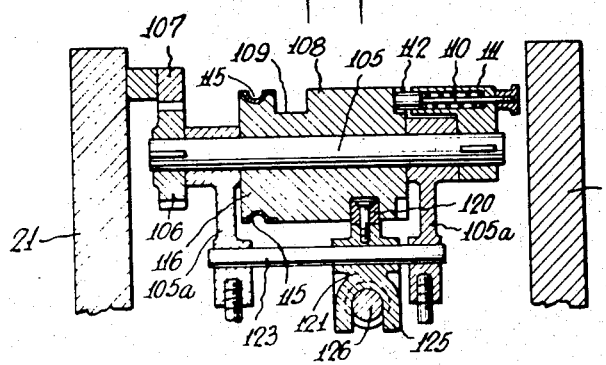
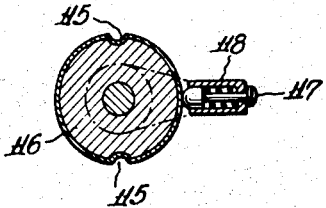
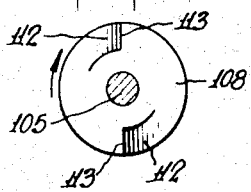
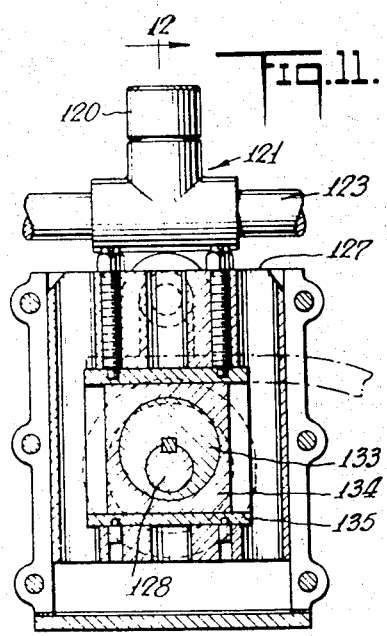
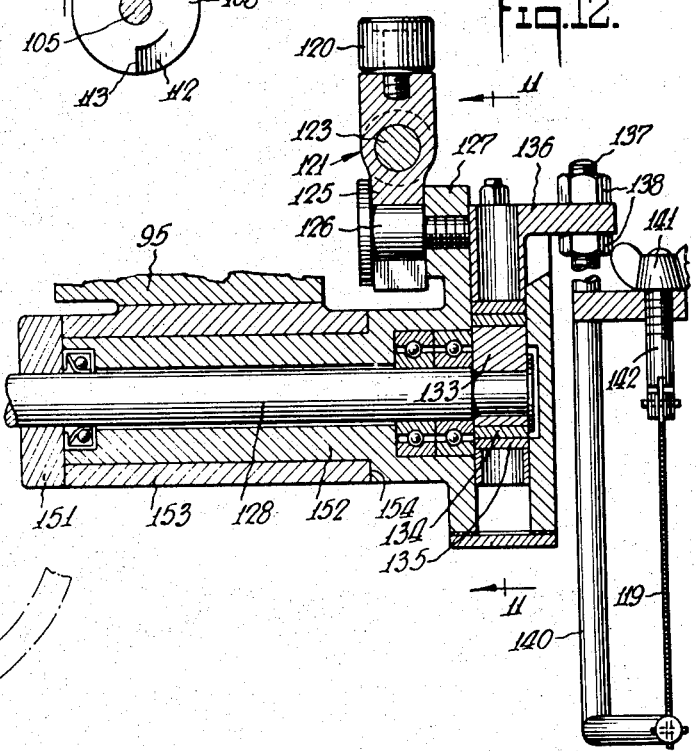
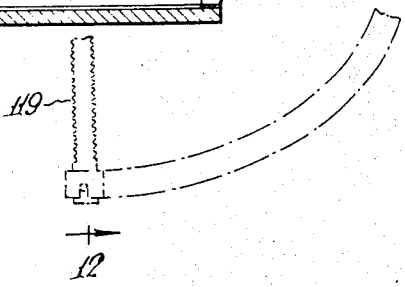
INVENTORS
Paul Phelps
John Hohl
BY
ATTORNEYS Patented Apr. 18, 1939

2,154,695

UNITED STATES PATENT OFFICE 2,154,695

TRAVELING CUT-OFF

Paul Phelps, Louisville, Ky., and John Hohl, Cranford, N. J., assignors, by mesne assignments, to The Girdler Corporation, Louisville, Ky., a corporation of Delaware Application June 5, 1936, Serial No. 83,688

20 Claims. (Cl. 107—21)

The present invention relates to an apparatus for continuously forming an endwise advancing bar and for cutting it into sections of uniform length.

Certain features of the invention are particularly applicable for forming and cutting bars of enwrapped or encased plastic material such as partially frozen ice cream, sherbet or the like, which are normally liquid at body temperature.

The mechanical handling of the partially frozen material, when exposed to room temperature, increases the temperature of said material and tends to soften or partially melt it. In the case of partially frozen ice cream having air whipped or incorporated therein to give it the desired overrun, such handling and such exposure cause deterioration. An endless conveyer employed for advancing the enwrapped bar and the traveling cutter, involves objectionable mechanical handling and undesirable vibrations, especially at high speeds.

One object of the present invention is to provide an improved bar forming and cutting mechanism in which the mechanical handling of the plastic material is reduced to a minimum.

Another object is to provide a mechanism of the type referred to, which can be safely and efficiently operated at comparatively high speeds, and thereby reduce the time of exposure to room temperature.

As the bar is being continuously produced and advanced endwise, the cutters must move with the bar as well as transversely thereof during the cutting operation. Due to the plastic nature of the enwrapped material and the lengths of the sections cut, the transverse movement of the cutter tends to bend or deform the bar transversely in the plane of application of said cutter.

As a feature of the present invention, means are provided which are movable with the cutter during its cutting stroke, for bracing or supporting the advancing bar at a section closely adjacent to the cutting plane and against the bending or deforming action of said cutter. As a further feature said bracing means also serves as a guide for the advancing bar.

As another feature of the present invention, the cutter is so constructed as to permit its efficient operation at high speeds without smearing or squeezing the material being cut and without tearing the wrapping thereof.

After the advancing bar has been cut into sections, these sections are preferably deposited on a conveyor and continuously advanced thereby through a hardening chamber. This hardening chamber conveyer is preferably provided with a series of bar carrier members fixed in predetermined spaced relationship thereon.

As another feature of the present invention, the operation of the hardening room conveyer is synchronized with the operation of the bar forming and cutting mechanism, and this conveyer is so positioned as to bring its bar carrier members successively into predetermined position to receive the sections of the bar as they are cut and discharged from the traveling cut-off.

As another feature, the path of movement of the hardening room conveyer is entirely within the hardening room or chamber, and the parts are so arranged that the bars drop through a slot in the wall onto the conveyer, and when hardened may drop through another slot out of the chamber.

Figure 2:
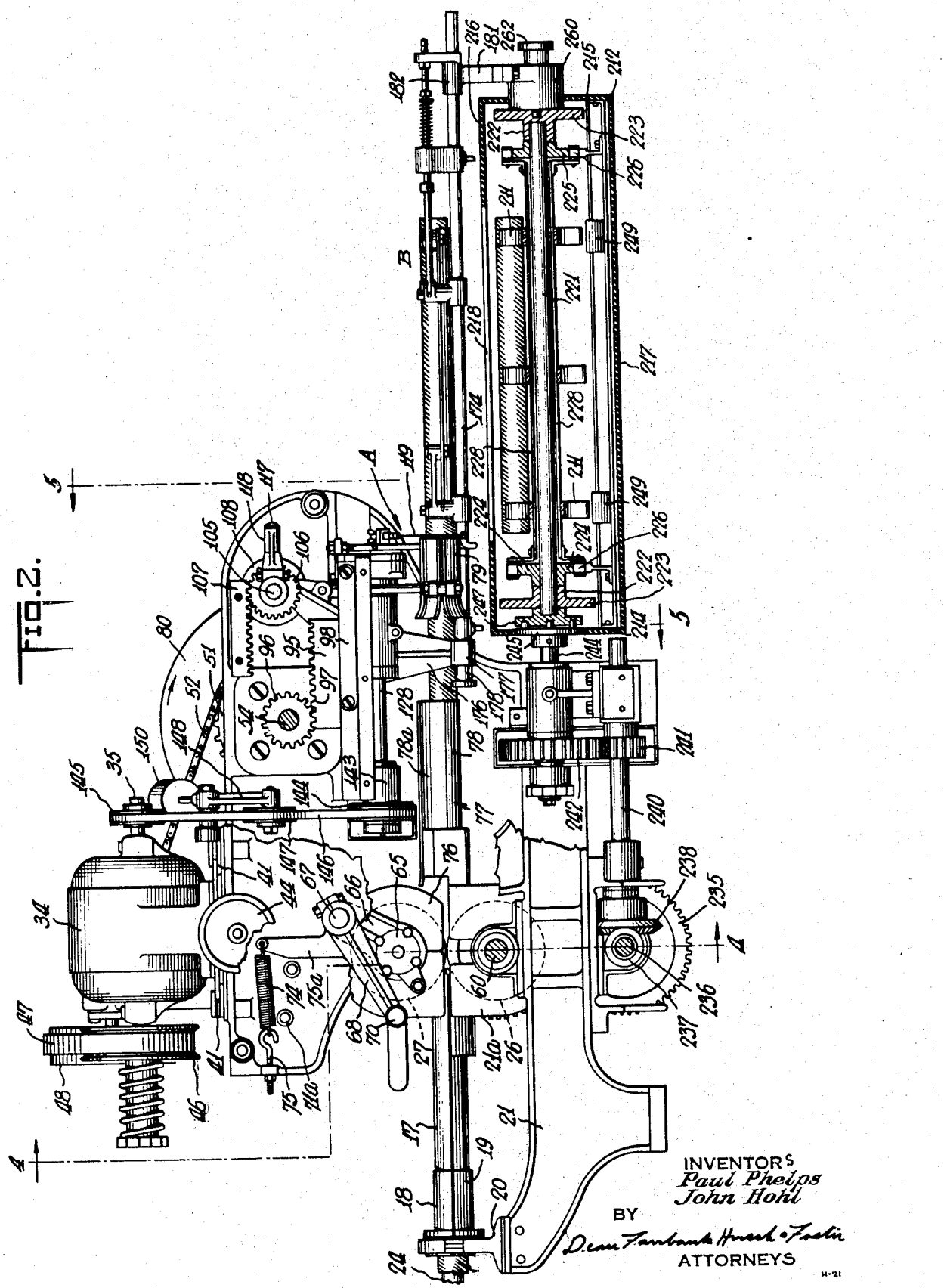
Figure 3:
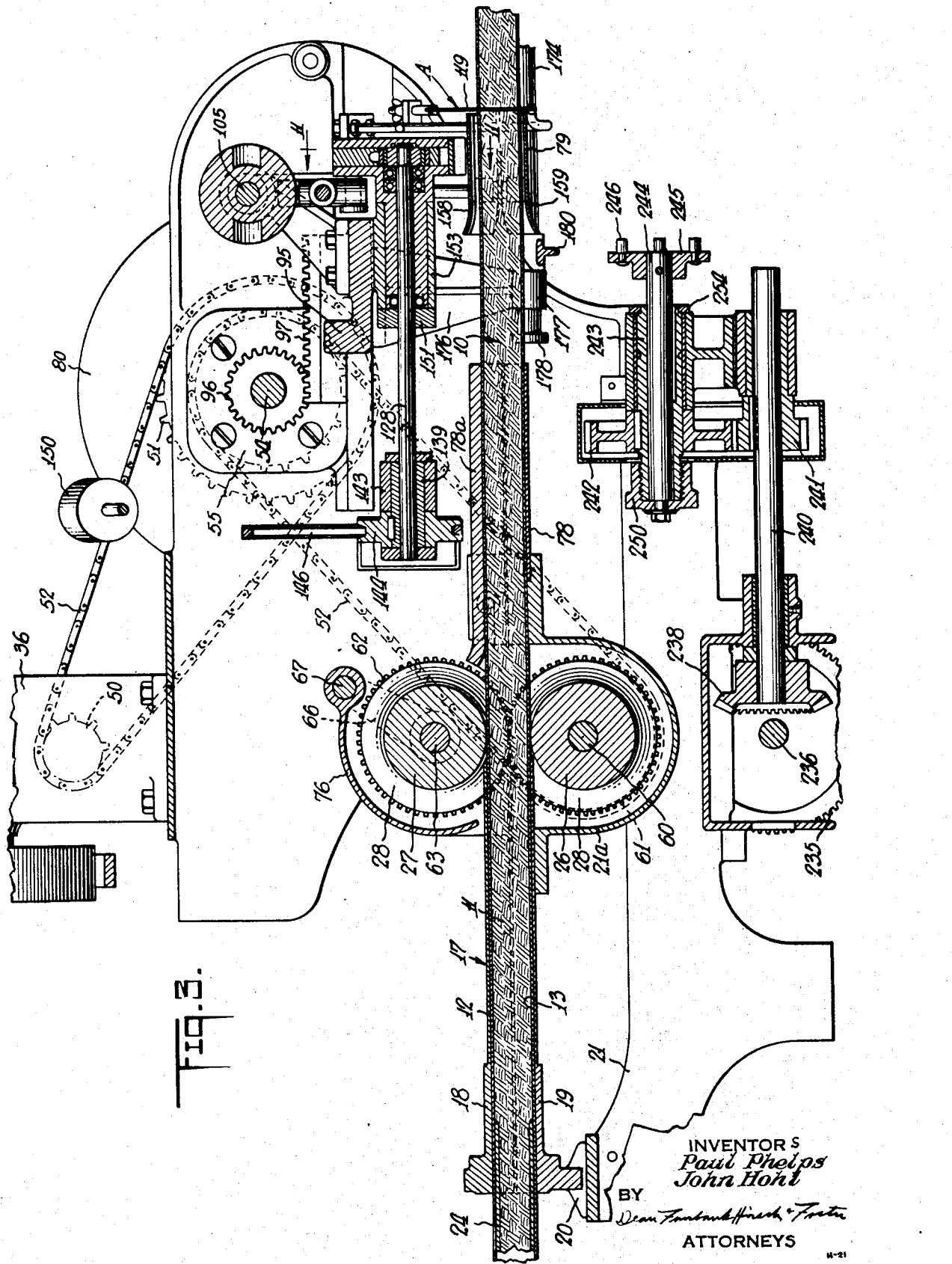
Figure 4:
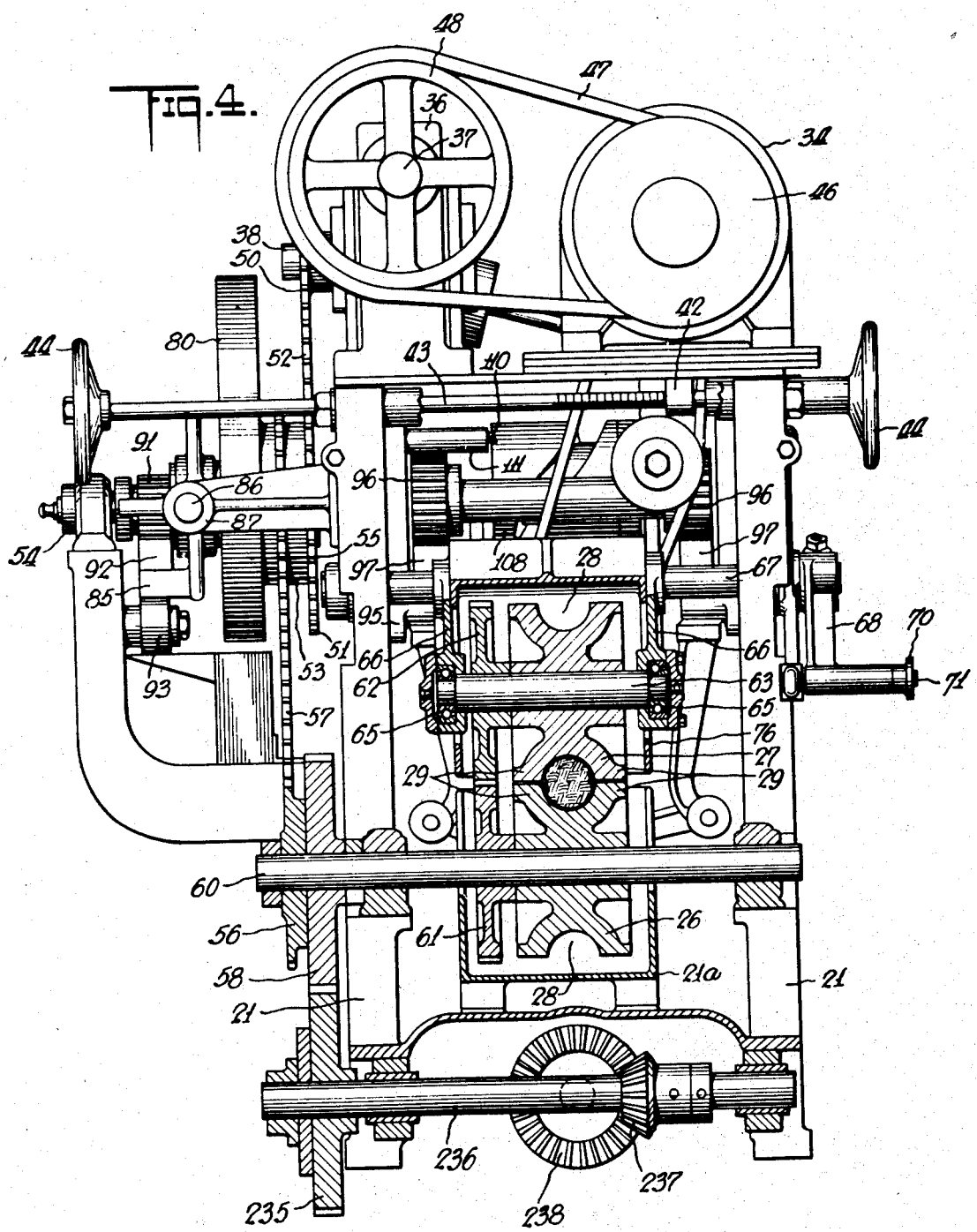
Figure 5:
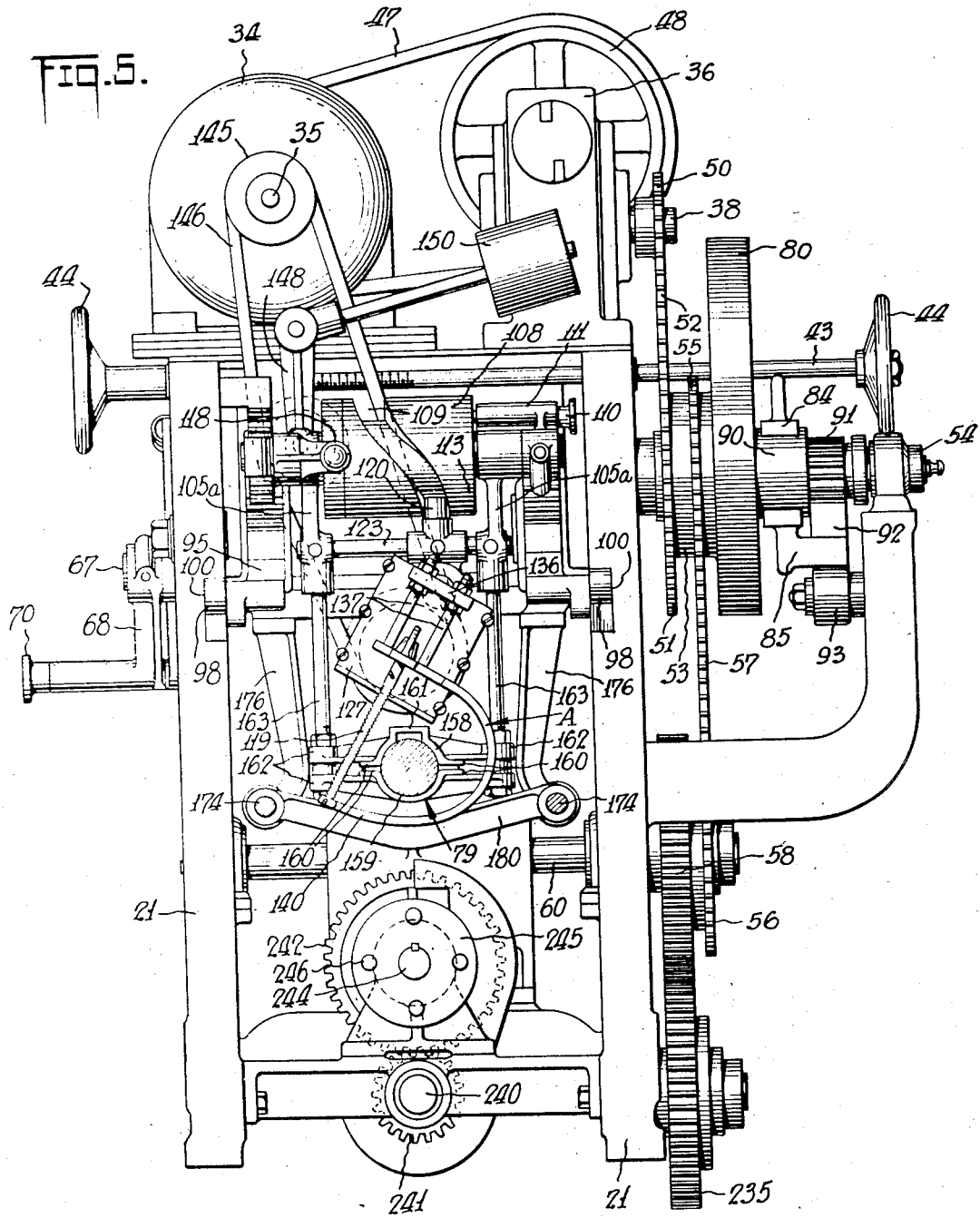
Figure 6:
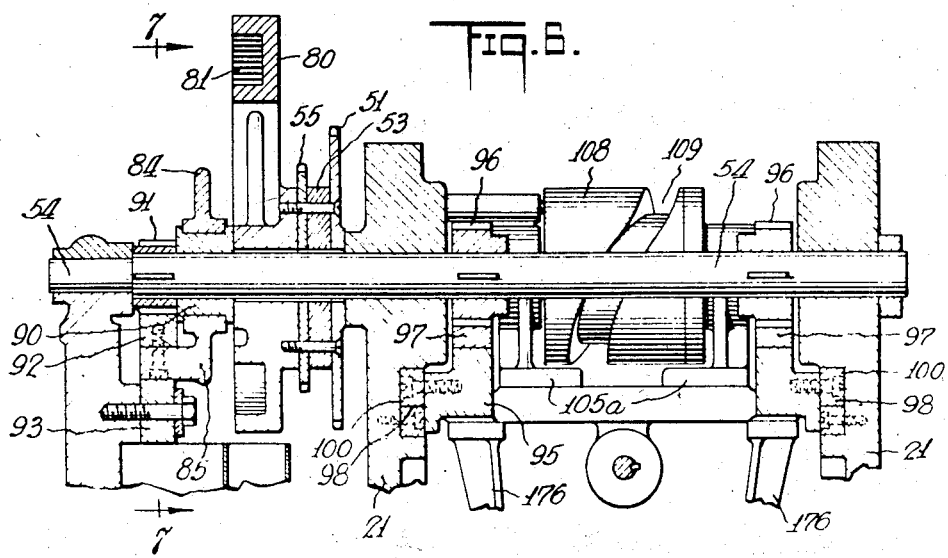
Figure 7:
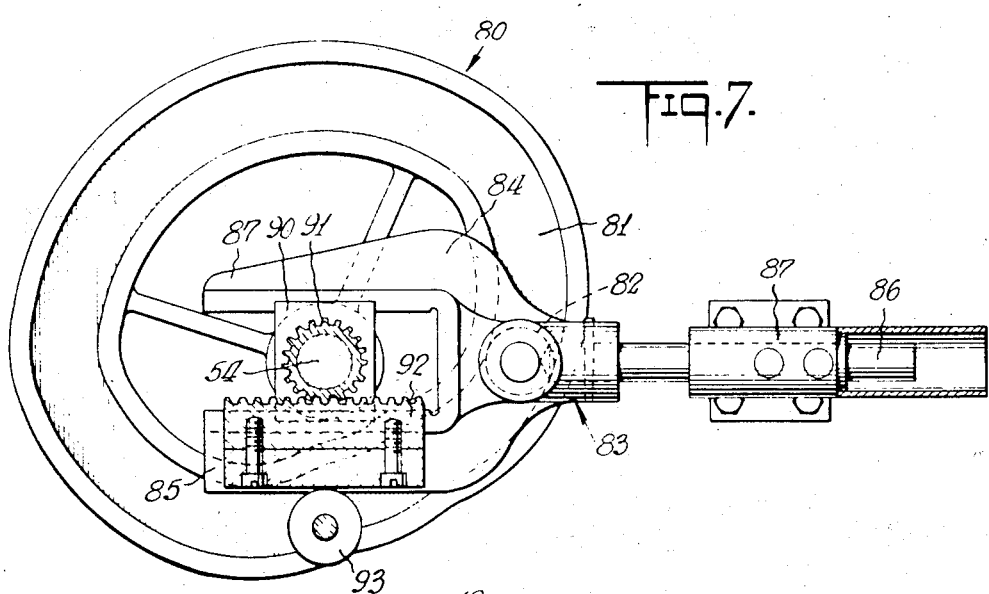
Figure 8:
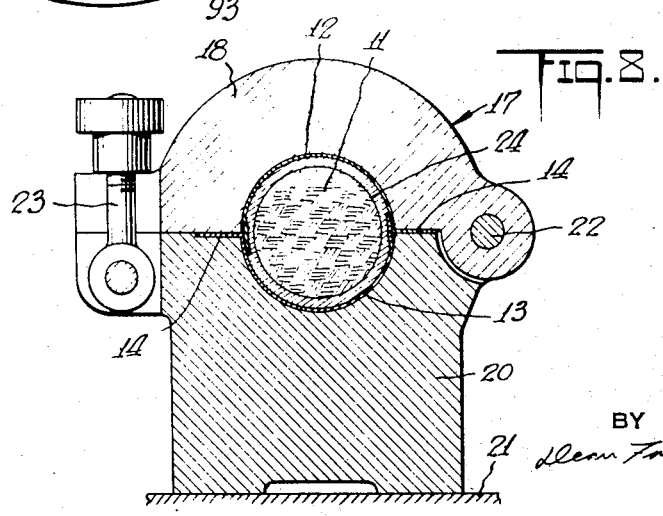

Various other objects, advantages and important features will be pointed out hereinafter, or will be apparent from a consideration of the specific construction which is illustrated in the accompanying drawings, and which constitutes only one of the many possible embodiments of the invention hereinafter claimed. In these drawings:

Fig. 1 is a top plan view of our improved bar forming and cutting mechanism shown in conjunction with a hardening room conveyer, Fig. 2 is a side elevation of the machine shown in Fig. 1, but with parts of the side frame structure broken away to more clearly show certain details thereof, other parts being shown in section, Fig. 3 is a longitudinal sectional view through the machine, taken on the line 3—3 of Fig. 1, Figs. 4 and 5 are transverse sectional views taken on the staggered lines 4—4 and 5—5 respectively of Fig. 2, Fig. 6 is an enlarged sectional detail taken on the line 6—6 of Fig. 1, Fig. 7 is an enlarged sectional detail taken on the line 7—7 of Fig. 6, Fig. 8 is an enlarged sectional detail taken on the line 8—8 of Fig. 1, Figs. 9 and 10 are sectional details taken on the lines 9—9 and 10—10 respectively of Fig. 1, Fig. 10a is an end view of the cam which swings the cutter back and forth across the path of movement of the advancing bar during its cutting stroke, Fig. 11 is an enlarged sectional detail taken on the line 11—11 of Fig. 3, Fig. 12 is a section taken on the line 12—12 of Fig. 11, Fig. 13 is an enlarged sectional detail of the bar drop and the conveyer disposed therebeneath to receive the bars taken on the line 13—13 of Fig. 1, and Fig. 14 is a perspective view of one end of a typical enwrapped plastic bar to be formed and severed.

The type of bar 10 shown in Fig. 14 comprises a cylindrical body portion of plastic material 11 having a wrapper which consists of two strips 12 and 13 of flexible sheet material such as paper, each strip being wrapped around slightly more than half of the bar. One side of each strip is overlapped by the other strip, while its other side is bent at an acute angle to form a tab 14. The overlapping portions of the strips 12 and 13 may be adhesively or otherwise detachably connected together as at 15. Such a bar is shown in the Vogt Patent 1,906,183, and it may be formed by the apparatus shown in the Vogt Patents 2,006,375 and 2,006,376, or any other suitable apparatus which will progressively form the bar as it advances endwise at a substantially uniform rate.

In the construction here illustrated, the two flexible strips 12 and 13 properly bent, are drawn through a former 17 comprising two longitudinal sections 18 and 19 conjointly defining a tubular passageway of substantially circular cross-section and serving to hold the wrapper strips 12 and 13 in tubular form, with the glued strips in juxtaposed position and the marginal sides or flaps 14 of said strips extending and guided between said sections as shown in Fig. 8. The lower section 19 is shown as supported at one end on a pedestal 20 fixed to the side frame plates 21 and at the other end is connected to a gear housing 21a. The upper section 18 is pivoted at one side to the lower section 19 by a pin 22, and held in place by a swingable bolt 23 at the other side. Thus, the upper guide section 18 may be swung out of position to facilitate the threading and cleaning of the machine.

The plastic material is continuously delivered from a suitable apparatus which, in the case of ice cream, partially freezes it to a comparatively stiff plastic form and incorporates therein the required amount of air to give it the desired overrun. Such an apparatus may be a continuous freezer, for instance of the type disclosed in Patents 1,783,866, 1,783,867 or 1,847,149. A conduit or nozzle 24 extends from the freezer or source into the tubular bar former 17 and may serve as a mandrel around which the wrapper is formed and progressively advanced endwise, while the filling material is delivered through said conduit, and from the end of the latter directly into the wrapper tube or casing.

The material delivered through the conduit 24 contains a large amount of air dissolved or uniformly dispersed therein and is under some compression so that as it escapes from the end of said conduit it expands and completely fills the wrapper. If the material does not contain any air and is therefore non-expansible, said material may be delivered through the conduit 24 at a slightly faster rate than the rate of advancement of the wrapper so that it will spread out and completely fill the wrapper, and its rate of advancement will be slowed down to that of the wrapper.

In the operation of the machine it is important that the rate of delivery to the wrapper be so controlled that said wrapper will be completely filled as fast as it is formed, and without danger of rupturing or expanding it or leaving voids therein. For this purpose, suitable means may be provided for controlling this delivery, preferably by a variable speed drive for the bar advancing mechanism.

The complete bar is advanced towards the cutting mechanism A by a pair of continuously rotating superposed traction rollers 26, 27, disposed just beyond the forward end of the tubular bar former 17, and each having a substantially semi-circular peripheral groove 28, the two grooves conjointly defining a circular opening for the bar 10.

The traction rollers are each provided with cylindrical flanges 29 on opposite sides of its groove 28 (Fig. 4), serving to grip the marginal tabs or flaps 14 of the wrapper strips 12 and 13, and not only advance the bar 10 itself but pull the strips 12 and 13 from the source of supply through the tube former 17 as said rollers are positively driven at the same peripheral speed from a motor 34. In order to selectively vary the speed of operation of these traction rollers 26, 27 there is provided a suitable variable speed transmission such as a Reeves drive between said motor 34 and said traction rollers. This transmission, in the specific form shown, includes a speed reducer 36 having an input shaft 37 and an output shaft 38. The motor 34 is mounted on a base plate 40 horizontally slidable in a pair of guide slots 41 formed in a horizontal frame plate, and is provided with a boss 42 (Fig. 4) having a threaded engagement with a rotatable screw 43 suitably supported against endwise movement in the frame structure of the machine. The screw has operating hand wheels 44 at one or both ends, whereby the motor 34 may be moved towards or away from the speed reducer 36 by merely turning one of said hand wheels 44.

The motor shaft 35 is provided at one end with an expansible pulley 46 which, by means of a belt 47, drives a pulley 48 mounted on the input shaft 37 of the speed reducer 36. The expansible pulley 46 is of the well known Reeves type and comprises a pair of opposed conical faced members pressed together by a spring which permits relative axial movement when the motor 34 is moved towards or away from the speed reducer, to vary the effective diameter of said pulley.

The transmission between the speed reducer 36 and the traction roller 26 includes a sprocket wheel 50 fixed on the output shaft 38, a chain 52 (Figs. 1, 4 and 5), a sprocket wheel 51 loosely mounted on a shaft 54 (Fig. 6), a sprocket wheel 55 rigidly but detachably secured to the sprocket wheel 51, a chain 57, and a sprocket wheel 56 on a shaft 60 supporting and fixed to the lower traction roller 26. The sprockets 51 and 55 may be spaced by a hub on one or by a collar 53.

The upper traction roller 27 has its shaft 63 driven from the shaft 60 by a pair of gears 61, 62 (Figs. 3 and 4). The two intermeshing gears 61 and 62 have the same pitch diameters as the outer diameters of their corresponding traction rollers 26, 27, so that these two rollers are operated at the same peripheral speed. This peripheral speed may be selectively varied through the operation of the hand wheel 44 to correspondingly vary the rate of advancement of the bar 10 through the machine.

In order to facilitate the threading up or cleaning of the machine, the upper traction roller 27 is so mounted that it may be readily separated from the lower traction roller 26. For that purpose, the ends of the shaft 63 of the upper traction roller 27 are journaled in bearings 65 in the free ends of the arms 66 (Figs. 2 and 4) fixed at their other ends to a crank shaft 67 which may be rotated by an arm 68 fixed to one end of the shaft 67, to swing the upper traction roller 27 away from the lower traction roller 26. The arm has a handle 70 provided with a spring-pressed bolt or plunger 71 which may be inserted through a hole 71a in the side frame plates 21 to hold said upper roller in raised position, and separated from the lower traction roller 26.

The pivotal support of the arms 66 is preferably above and at the delivery side so that the meshing of the gears and the engagement of the roller flanges with the bar flanges will tend to press the rollers together and increase the grip on said bar flanges in the nature of a toggle. The upper traction roller 27 may be spring-pressed against the lower traction roller 26 by means of a coil spring 74, one end of which is fixed to the frame structure of the machine through an adjustable screw hook 75, the other end being connected to the outer end of an arm 75a fixed to the shaft 67.

The upper traction roller 27 may be provided with a cover or casing 76 supported on its shaft 63. The lower traction roller 26 and the gear 61 are enclosed in the housing 21a which serves not only to enclose these members but also to support one end of the lower section 19 of the bar former 17 as already set forth.

The bar 10 is delivered by the traction rollers 26 and 27 through a fixed tubular guide 77 comprising a fixed lower section 78 connected to the housing 21a and an upper section 78a which is preferably movably mounted to permit threading and cleaning of the machine, these two sections forming therebetween longitudinal slots through which the tabs 14 of the bar may be guided (Figs. 2 and 3). From this tubular guide 77 the bar 10 is advanced through an axially movable guide 79 and into the field of action of the cutting mechanism A.

The cutting mechanism A moves with the advancing bar 10 as well as transversely thereof during the cutting stroke, this movement being timed in accordance with the operation of the traction rollers 26 and 27. For that purpose, the sprocket wheel 55 which is driven as already set forth, has secured at one end thereof a cam 80 having a face groove 81 in which is mounted a roller 82 (Figs. 1, 4, 5, 6 and 7). This roller 82 is rotatably mounted on a cam follower 83, one end of which has a yoke formed of a pair of spaced arms 84 and 85, the other end of which has a shank 86 mounted to reciprocate in a fixed tubular guide 87. These two yoke arms 84 and 85 of the cam follower extend in guide grooves on opposite sides of a block 90 which is loosely mounted on the shaft 54.

Keyed or otherwise secured to the shaft 54 is a pinion 91 which meshes with a rack bar 92 fixed to the yoke arm 85, the lower edge of which rides over an idler guide roller 93. Thus the rotation of the cam 80 loose on the shaft 54 causes the rectilinear reciprocation of the cam follower 83 and its rack bar 92, and the latter by its intermeshing with the pinion 91 causes an oscillation of the shaft 54. This oscillation of the shaft 54 is transmitted to a cutter carrying carriage 95 by a pair of pinions 96 fixed to said shaft and meshing respectively with a pair of rack gears 97 (Fig. 2) connected to the sides of said carriage. This carriage 95 has a pair of side flanges 98 extending into a pair of guide slots 100 in the side frame plates 21, so that as the shaft 54 is oscillated the carriage 95 is correspondingly reciprocated along said slots (Figs. 5 and 6).

The cam groove 81 is so shaped and the transmission between the motor 34 and the carriage 95 is such that the carriage and the cutter carried thereby during forward movement (to the right as shown in Fig. 2), travel at the same speed as the advancing bar 10.

The means for supporting the cutting mechanism on the carriage 95 and for angularly oscillating said mechanism to effect the cutting stroke includes a shaft 105 journaled in brackets 105a connected to the forward end of said carriage and having keyed or otherwise connected thereto a gear 106 meshing with a fixed rack gear 107 secured to one of the side frame plates 21 (Fig. 9). The pinion 106 is of such size in respect to the length of the path of movement of the carriage 95 that the shaft 105 is oscillated through only one-half a revolution.

Loosely mounted on the shaft 105 is a cylindrical cam 108 having a cam groove 109 serving to swing the cutting mechanism back and forth across the path of movement of the advancing bar 10 but moving it only during the forward movement of the carriage 95. A spring-pessed pawl 110 mounted on a collar 111 fixed to the shaft 105, cooperates with a ratchet face at one end of said cam. The ratchet face is formed of a pair of ramped recesses 112 terminating in ratchet catches 113 at diametrically opposite sides of the cam axis.

In the operation of this cam mechanism, during the forward movement of the carriage 95, the pawl 110 rotating with the shaft 105 engages one of the catches 113 of the cam 108 to rotate said cam in a clockwise direction, as shown in Fig. 10a, for one-half of a revolution. During the return movement of the carriage 95 to the left, as shown in Fig. 2, the pawl 110 moving in a counterclockwise direction (Fig. 10a) rides idly over the ramped recess 112 of the cam 108 so that said cam remains stationary. At the end of this return movement of the carriage 95, the pawl 110 will reach the other ratchet catch 113 so that upon the next forward movement of said carriage, said pawl will be in position to engage said latter catch and rotate the cam 108 another half revolution.

In order to insure against accidental rotation of the cam 108 during the return movement of the carriage 95, one end of the cam is provided with a brake drum 116 (Figs. 9 and 10) mounted for rotation with the cam 108 and provided with a pair of diametrically opposed depressions 115 on the periphery thereof, adapted to cooperate with a spring-pressed stop bolt 117 mounted in a fixed sleeve 118. The two depressions 115 are so mounted with respect to the bolt 117 that upon the completion of the forward stroke of the carriage 95, one of these depressions will be opposite to said bolt. In this position, the bolt 117 will snap into said latter depression and hold the cam 108 against further rotation until the next forward movement of the carriage 95. The sides of the depressions are curved or inclined and the forward or locking end of the bolt 117 is correspondingly curved or inclined so that upon forward movement of the carriage 95, the action of the pawl 110 on the cam 108 will overcome the locking resistance of said bolt and permit said cam to be rotated.

The cam 108 acts to swing the cutter 119 only during the forward movement of the carriage 95, and in one direction during one forward movement of the carriage and in the opposite direction during the next forward movement. For that purpose, there is provided a cam roller 120 (Figs. 5, 9, 11 and 12) disposed in the cam groove of the cam 108 and mounted for rotation on the upper tubular extension of a cross member 121 having a sliding engagement with a rod 123 which is connected at its ends to the carriage brackets 105a. The lower part of the cross member 121 has a yoke 125 which straddles a pin 126 connected to a member 127 (Fig. 12) which is mounted to oscillate on a shaft 128 and which forms a housing for a mechanism which reciprocates the cutter 119 endwise.

This reciprocating mechanism includes an eccentric 133 fixed to the shaft 128 and mounted for rotation in a Scotch yoke which includes a block 134 mounted for transverse movement in a guide 135 which in turn is mounted for slidable movement in the guide housing 127. The guide 135 extends beyond the upper end of the housing 127 and is provided with a transverse flange 136 in which are mounted a pair of screw studs 137 held in adjustable position on the flange 136 by a pair of locking nuts 138, and having their lower ends fixed to one end of a bowed saw frame 140. Stretched across this saw frame 140 is the cutter 119 which is in the form of a double edged very fine saw blade. The tension on this saw blade 119 may be adjusted by a wing nut 141 screwed to a shank 142 connected to the upper end of said saw and passing through the upper end of the saw frame 140. The tightening of the wing nut may impart tension to the saw blade by bending the frame if the latter be resilient, but preferably there is a coil spring beneath the wing nut.

For supporting and continuously rotating the shaft 128, there is splined thereto a sleeve 139 (Figs. 2 and 3) which is journaled in a fixed bearing bracket 143 secured to the frame structure of the machine. The sleeve is held against axial movement while permitting the shaft 128 to move endwise therein in accordance with the movement of the carriage 95. This shaft 128 is continuously rotated from the motor 34 by a suitable transmission which, in the specific form shown, includes a pulley 144 fixed to the sleeve 139 and driven from a pulley 145 on the motor shaft 35, by a belt 146. Thus the saw is continuously reciprocated by the action of the cam 133 on the shaft 128 which is continuously rotated by the motor 34 acting through the belt 146.

Since the motor 34 is movable for speed adjustments of the Reeves drive, the resulting slack in the rope belt 146 is taken up by an idler pulley 147 mounted at one end of a pivoted arm 148 and yieldably urged against said rope belt 146 by a counterweight 150.

The forward end of the shaft 128 is journaled in a sleeve 152 (Fig. 12) which forms an extension of or is otherwise connected to the housing 127, and which is loosely embraced by a bearing 153 connected to the bottom of the carriage 95 so that said housing may be angularly oscillated in said bearing 153 through the action of the cam 108 as already described. This bearing 153 at one end abuts a collar 151 fixed to the shaft 128 and at the other end an axially facing shoulder 154 formed in the sleeve 152 so that said shaft is movable endwise in the fixed bearing bracket 143.

The saw blade 119 operates adjacent to the outlet end of the tubular guide 79 which is flared at its entry end and which is connected for axial movement with the carriage 95. This tubular guide 79 serves to effectively support or brace the advancing bar against the transverse section of the saw blade 119 near the plane of action of said saw blade, and comprises an upper section 158 and a lower section 159 (Figs. 3 and 5). These sections are shaped to conjointly form a passageway for the advancing bar 10 and have side flanges 160 serving to guide the bar tabs 14 therebetween. One of said sections, as for instance the upper section 158, has a trough-like depression 161 which serves to permit a limited deformation of the bar 10 resulting from pressure action of the saw blade 119, thereby avoiding any pressure of the bar against said tubular guide 79, which would retard the continuous uniform advancement of said bar.

In order to support the tubular member 79 for movement with the carriage 95, the side flanges 160 have connected thereto bosses 162 which receive the lower ends of uprights or rods 163, the upper ends of which are threaded into or otherwise secured to carriage brackets 150a. This construction serves to move the tubular guide 79 back and forth in a relationship to the plane of cutting movement of the saw blade 119.

While the operation of the cutting mechanism is in a large measure self-evident from the foregoing description, such operation is briefly summarized as follows:

The carriage 95 moving back and forth in timed relationship with the rotation of the traction rollers 26 and 27, causes the rotation of the cam 108 one-half of a revolution during each forward movement of said carriage. This forward movement of the carriage causes a corresponding movement of the saw blade 119 and the tubular guide 79 with the advancing bar. At the same time the rotation of the cam 108 one-half of a revolution causes the housing 127 to be swung about the continuously rotating shaft 128 to correspondingly swing the reciprocating saw blade 119 transversely across the advancing bar and to cut a section of said bar. Upon completion of the cutting stroke, the carriage 95 moves back, carrying with it the saw blade 119 and the tubular guide 79. During this return movement the cam 108 is stationary, so that the saw blade 119 maintains the angular position it assumed at the end of its last cutting stroke. During the next forward movement of the carriage 95, the rotation of the cam 108 is continued another half a revolution, this causing the saw blade 119 to swing back to its original position while said blade and the tubular guide 79 are moving with the advancing bar. It is seen, therefore, that the saw blade 119 is double acting and cuts two successive bar sections during each complete swinging cycle of said blade.

The forward end section of the bar, after passing the field of operation of the saw blade 119 is delivered onto a bar drop mechanism B and supported thereon until said section has been cut off. This mechanism includes a pair of longitudinal members 170 having transversely curved portions 171 conjointly defining a semicircular bar supporting trough 172 alined with the tubular guide 79 (Figs. 1, 2 and 13).

The bar supporting members 170 are mounted for endwise movement back and forth with the carriage 95. For that purpose there is provided a pair of parallel rods 174 secured respectively at one end to a pair of spaced hangers 176 (Figs. 2, 3, 5 and 6) connected to the underside of the carriage 95. Said rods 174 may be secured to the hangers 176 in any suitable manner. For instance, said hangers may terminate at their lower ends in sleeves 177 and the inner ends of the rods 174 may extend through said sleeves 177 and be provided with threaded extensions upon which nuts 178 abutting one end of the sleeves 177 are screwed. Abutting the other ends of the sleeves 177 is a member 180 having collar portions fixed to the rods 174 and serving not only to hold the rods 174 against endwise movement to the left as shown in Fig. 1 with respect to the hangers 176, but also serving as a cross brace for the rods 174 to hold said rods in parallel relationship. These rods 174 are guided for endwise movement by a fixed bracket 181 having a pair of slide bearings 182 (Figs. 1, 2 and 13).

The bar supporting members 170 are connected to the rods 174 for slidable movement therewith. For that purpose each member 170 is provided with a substantially horizontal side flange 183 to which is pivotally connected one end of links 184 and 185, the other ends of which are pivotally connected respectively to collars 186 and 187 fixed to an adjoining rod 174.

For tripping the bar drop mechanism at the end of the cutting stroke so as to release the cut bar section supported thereon, each link 185 constitutes one arm of a bell crank, the other arm 190 of which is pivotally connected to one end of a trip rod 191. This trip rod 191 is guided for slidable movement in a member 192 which is fixed to the rods 174 for slidable movement therewith, and which may serve as a cross brace for said rods. Each trip rod 191 has its portion extending beyond the brace 192 encircled by a coil spring 194, one end of which abuts one side of said brace, the other end abutting a pin 195 fixed to the outer end of said trip rod. Thus, the trip rods 191 are urged towards the right as shown in Fig. 1 between cutting periods. This action serves to urge the two bar supporting members 170 into closed bar supporting position C shown dotted in Fig. 13. This closed position of the two bar supporting members 170 is determined by stops 196 connected to the trip rods 191 and abutting one side of the brace 192 in this position.

In order to laterally separate the two bar supporting members 170 at the end of each cutting stroke, the fixed guide bracket 181 has a pair of ears 197 which support, respectively, a pair of members 198 serving as targets for the trip rods 191. In the specific form shown, these target members 198 are in the form of bolts adjustably threaded into the bracket ears 197. The heads of these target bolts 198 engage the outer ends of the trip rods 191 at the end of their forward stroke, and prevent said rods from moving further to the right as shown in Fig. 1 against the action of the springs 194, thereby causing the bell cranks 188 to be rotated. The links 184 and 185 of each bar supporting member 170 are in substantially parallel relationship so that this operation imparts to the two bar supporting members 170 a lateral movement away from each other towards the position shown in Fig. 1 and the position shown in full lines in Fig. 13, and a forward movement with respect to the supported bar. This compound movement of the bar supporting members 170 serves to carry the bar section which has been cut, beyond the forward end of the succeeding bar, and to release said bar section so that it may drop by gravity as shown in Figs. 1 and 13.

Upon the return movement of the carriage 95, the rods 174 with their bar supporting members 170 are moved to the left (Fig. 1), the two trip rods 191, under the action of the springs 194 are returned into their normal position, and the two bar supporting members 170 are again brought together into position to receive the advancing end of the bar. During the next forward movement of the carriage 95, the bar supporting members 170 move with the advancing bar and with the forward section of said bar resting on said members.

The rear ends of the bar supporting members 170 are close to the plane of the blade 119 so that during cutting periods the advancing bar on both sides of the blade is amply supported against the pressure action of said blade.

Disposed below the bar drop mechanism B is a conveyer 210 carrying a series of carrier members 211 for continuously advancing the bar sections through a refrigerated hardening chamber which latter has an extension 212 disposed directly below said bar drop mechanism. This hardening chamber extension 212 has a pair of side walls 214 and 215, a top wall 216 and a bottom wall 217. The top wall 216 is provided with a longitudinal slot 218 directly below the bar supporting members 170, said slot being of sufficient size as to permit the bar sections, as they are released from said members, to drop freely therethrough onto the bar carrier elements 211 of the conveyer 210.

The conveyer 210 is provided with a drive shaft 221 which is journaled in bearings 222 connected to plates 223 extending into the hardening chamber extension 212 between the side walls 214 and 215 of the latter. Said shaft has two drive sprockets 224, 225 supporting two endless articulated link chains 226 carrying therebetween bars 228 for the carrier members 211 at suitable equally spaced intervals. These bar carrier members 211 are of such shape and size as to receive the bar sections dropped thereon through the hardening chamber opening 218.

As an important feature of the present invention, the hardening room conveyer 210 is operated in timed relationship with the bar drop mechanism B, so that at the instant this mechanism is tripped to release the bar section thereon, a carrier element 211 on said conveyer will be directly below the hardening room opening 218 ready to receive the bar. For that purpose, the gear 58 which is driven from the motor 34 meshes with a gear 235 fixed to a shaft 236 which carries a bevel gear 237 meshing with a bevel gear 238 fixed to one end of a shaft 240 (Figs. 2, 3 and 4). This shaft 240 carries a pinion 241 meshing with a gear 242 keyed on a suitably journaled bearing sleeve 243. Extending into said bearing sleeve 243 for rotation therewith is a shaft 244 the outer end of which carries a clutch element 245. In the specific form shown, this clutch element 245 is in the form of a flange having a series of coupling pins 246 on the outer face thereof, and cooperates with a coupling element 247 which is fixed to the end of the conveyer drive shaft 221 and which is provided with apertures for receiving said pins. By means of this construction, the conveyer drive shaft is operated in timed relationship with the bar advancing mechanism, the bar cutting mechanism and the bar drop mechanism, and the various transmission members are so proportioned that the conveyer chains 226 between the successive bar dropping operations are moved a distance equal to the distance between adjacent bar carrier members. These chains 226 are so arranged with respect to the bar drop mechanism as to bring these carrier members on the upper run of the conveyer successively below the hardening room opening 218 at the instant said bar drop mechanism is tripped. As the bar sections are dropped onto the carrier members on the upper run of the conveyer 210, they are continuously advanced toward the right as shown in Fig. 13 and through the hardening room. As these bar sections complete their travel through the hardening room they are carried by the lower run of the conveyer as shown in Fig. 13 and dropped through an opening in the bottom wall 217 of the hardening room extension 212 and onto a chute 249. The bar sections, after being frozen hard in the hardening room, may be cut into individual portions and packaged.

In order to permit the two shafts 244 and 221 to be easily uncoupled, the sleeve 243 is externally threaded at its inner end and is engaged by a nut 250 which is connected to one end of the shaft 244 for axial movement therewith, but which may be rotated with respect to said shaft 244. The sleeve 243 is held against endwise movement between a collar 254 and the side of the gear 242, and the shaft 244 is splined to said sleeve for endwise movement therein, so that the rotation of the nut 250 causes the axial movement of the shaft 244 and the coupling element 245 into and out of engagement with the coupling element 247 on the conveyer drive shaft 221. The coupling is so disposed that the element 247 is within the hardening room extension and therefore when the clutch element 245 is disengaged the conveyer may be moved out of its housing.

The bar drop mechanism B may be detachably mounted at one end to the hardening room extension 212. For instance, the guide bracket 181 of this mechanism may have a boss 260 which extends through a hole in the side wall 215 of the hardening room extension 212, and which is secured to the frame plate 223 by a screw 262. By loosening the screw 262 and the nuts 178, the whole bar drop mechanism may be removed for cleaning purposes, and the loosening of the screw 262 also liberates the conveyer for removal from its casing.

From the foregoing it will be noted that in the specific form of the improved mechanism illustrated, a bar of enwrapped partially frozen ice cream is advanced continuously and at a substantially uniform rate from the mechanism which forms the bar, and the advance end is supported by a carriage which moves with the bar. During the advancing movement, a cutter carried by the carriage moves transversely through the bar to cut off a section between two points of moving supports, and thereafter the severed section is dropped onto the hardening room conveyer. The cutter moves transversely only during the forward movement of the carriage and this transverse movement is in one direction during one advancing movement, and in the opposite direction during the next successive advancing movement of the carriage.

The cutter is in the form of a high speed, narrow, thin, double-edged, reciprocating saw blade so that the minimum amount of material is removed from the kerf made by the saw. The range of reciprocating movement of the saw is very short so that very little of the plastic material is carried out by the bar and there is the minimum smearing of the end of the bar in case the bar be formed of a center core of one material and an annular section of a different kind of material.

All of the parts are so designed that access may be readily gained thereto for cleaning, and the sections are cut off and dropped onto the hardening room conveyer at the minimum distance from the point at which the bar is formed. Thus there is the minimum time of exposure of the partially frozen material to the action of room temperature.

The cutter operating mechanism illustrated is designed for cutting a bar section of a predetermined length. If it is desired to change the length, the cam 80 may be replaced by one giving a different length of carriage movement, and the appropriate change may be made in the sprocket 55 or the sprocket 56 or both to keep the speed of travel of the bar and carriage in synchronism.

Only a portion of the hardening room and its conveyer is illustrated, as the details of construction of the conveyer and of the hardening room form no portion of the present invention but are disclosed and claimed in a copending application.

Having thus described our invention, what we claim as new and desire to secure by Letters Patent is:

1. A traveling cut-off for continuously advancing material, including a double-edged reciprocatory blade movable transversely through the material to cut the same while traveling with the material, and control means for effecting transverse cutting movement in one direction during alternate forward movements, and transverse cutting movement in the opposite direction during the other forward movements.

2. A cut-off mechanism for continuously advancing material, including a carriage movable back and forth along the line of travel of the material, a reciprocatory blade carried by said carriage, means for moving the blade transversely of the carriage during one movement of the carriage in the direction of travel of the material, and moving said blade transversely of the carriage in the opposite direction during the next succeeding movement of the carriage in the direction of travel of the material.

3. A cut-off mechanism for continuously advancing material, including a carriage movable back and forth in the direction of travel of the material, a cutter pivoted to swing transversely of the carriage, means for reciprocating said cutter during its swinging movement, and control means for imparting to the cutter a swinging movement having a periodicity twice that of the carriage, whereby the cutter moves transversely in one direction during alternate forward movements of the carriage, and in the opposite direction during the other forward movements.

4. A cut-off mechanism for advancing material, including a carriage movable back and forth in the direction of travel of the material, a saw pivoted to swing transversely about an axis parallel to the line of travel of the material, and means concentric with said axis for reciprocating said saw.

5. A traveling cut-off including a carriage movable back and forth in the direction of travel of the material to be cut, a shaft mounted on said carriage and extending lengthwise thereof, a double-edged saw blade, means driven by said shaft for reciprocating said saw blade, and means on said carriage for intermittently swinging said saw blade about the axis of said shaft as a center, the direction of swinging movement being in opposite directions during successive movements of the carriage in the same direction with the material.

6. A traveling cut-off including a carriage movable back and forth in the direction of travel of the material to be cut, a cutting blade mounted on said carriage, a cam for swinging said blade transversely of the direction of movement of the carriage and about an axis parallel to the path of movement of the carriage, and means for operating said cam intermittently and only during the movement of the carriage with the material.

7. A traveling cut-off including a carriage movable back and forth in the direction of travel of the material to be cut, a double-edged cutting blade mounted on said carriage, a cam for swinging said blade transversely of the direction of movement of the carriage and about an axis parallel to the path of movement of the carriage, and means for operating said cam intermittently and only during the movement of the carriage with the material, and permitting the blade to remain substantially at rest during return movement of the carriage, said cam being of such shape as to effect transverse movement of the blade in one direction during one movement of the carriage with the material and transverse movement in the opposite direction during the next successive movement of the carriage with the material.

8. A traveling cut-off including a carriage movable back and forth in the direction of travel of the material, a shaft extending lengthwise of said carriage, means for continuously rotating said shaft, a saw blade mounted on said carriage, means operated by said shaft for reciprocating said blade, a cam mounted on said carriage and rotatable about an axis transverse to the direction of movement of the carriage, means for rotating said cam only during the movement of the carriage in one direction, and means operated by said cam for swinging said blade about the axis of said shaft as a center.

9. A traveling cut-off for continuously advancing material, including a frame, a carriage movable back and forth on said frame in the direction of travel of the material, a shaft mounted in said frame, a cam loosely mounted for rotation on said shaft, driving means between said cam and said shaft for oscillating the shaft during the rotation of the cam, driving means between said shaft and said carriage for reciprocating the carriage, a cam mounted on said carriage and rotatable about an axis parallel to said shaft, a stationary rack bar having one-way driving connection with said second mentioned cam for rotating the latter during movement of said carriage in one direction only, a cutter mounted on said carriage, and means connecting said cam and said cutter for swinging the latter first in one direction and then in the other during rotation of said second mentioned cam.

10. A traveling cut-off for advancing material, including a carriage having a rack bar carried thereby, an oscillating shaft mounted independently of the carriage and having a pinion meshing with said rack bar, a rack bar mounted independently of said carriage, a cutter mounted on said carriage, and means mounted on said carriage and engaging said second mentioned rack bar for swinging said cutter during movement of said carriage.

11. A traveling cut-off including a carriage movable back and forth in the direction of travel of the material to be cut, a shaft mounted on said carriage and extending parallel to the direction of movement of the carriage, a reciprocatory saw, a frame carried by said saw, and mounted to oscillate about the axis of said shaft for swinging said saw, and an eccentric mounted on said shaft and operatively connected to said saw for reciprocating the latter during its swinging movement.

12. A traveling cut-off for a bar continuously advancing endwise, including a carriage movable back and forth in the direction of travel of said bar, a tubular guide for said bar and mounted on said carriage, a double-edged cutter blade mounted on said carriage, means on said carriage for reciprocating said blade, and means also on said carriage for swinging said blade back and forth through said bar closely adjacent to one end of said tubular guide.

13. A traveling cut-off for a bar continuously advancing endwise, including a carriage movable back and forth in the direction of travel of said bar, a support mounted on said carriage for said bar, a pair of members also on said carriage and conjointly forming a second support for said bar beyond said first mentioned support, means for transversely subdividing the bar between said supports during the movement of the carriage with the bar, and means for separating said members to permit the cut off section to drop between them when the carriage reaches a predetermined point in its travel with the bar.

14. A traveling cut-off for a continuously advancing bar, including a carriage, means for cutting from the bar a terminal section during the movement of the carriage with the bar, a pair of members conjointly forming a substantially semi-cylindrical support for the end portion of the bar and mounted on the carriage beyond said cutting means, and means for separating said members to drop the cut off section therebetween when the carriage reaches a predetermined point in its path of travel with the bar.

15. In an apparatus having means for continuously advancing a bar, a carriage movable back and forth in the direction of travel of the bar, a cutter for intermittently cutting a terminal section from the bar during movement of the carriage in one direction, and a conveyor movable transversely of the direction of movement of the carriage and beneath the latter, the combination of a casing enclosing said conveyor and having a slot through which the cut off sections drop onto the conveyor, a drive shaft, and means operated thereby for advancing said conveyor, in timed relationship with said carriage and cutter.

16. A cut-off mechanism for a bar of plastic material, including a wrapper having oppositely disposed outwardly extending flanges, said mechanism including a pair of traction rollers having flanges for gripping the flanges of said bar to continuously advance the bar at a uniform rate, a carriage movable back and forth in the direction of travel of the bar, and having a support for the terminal portion of the bar, a cutter mounted on said carriage for intermittently cutting from the bar a terminal section resting upon said support, a drive shaft, means operated thereby for rotating said traction rollers, means also operated thereby for effecting back and forth movement of the carriage, and means for intermittently operating said support to drop therefrom the cut off section.

17. A cut-off mechanism for a cylindrical bar of plastic material having a wrapper presenting opposite side flanges, said mechanism including a pair of traction rollers having peripheral grooves cooperating to form a passage for said bar, and having side flanges for gripping the flanges of the bar to continuously advance the latter at a uniform rate, and a carriage beyond said traction rollers and movable back and forth in the direction of travel of the bar, said carriage having a transversely movable cutter for cutting off a terminal section of the bar during each movement of the carriage in the direction of movement of the bar, and means for operating said carriage in timed relation with said traction rollers.

18. In an apparatus having means for continuously advancing a bar of plastic material, a carriage movable back and forth in the direction of travel of the bar, a cutter for subdividing from the bar successive terminal sections during the movement of the carriage with the bar, and a conveyor beneath said carriage and movable in a direction at right angles to the direction of movement of the carriage, the combination of a casing enclosing said conveyor, a driving connection for said conveyor, for operating the same in timed relationship with said carriage, and a clutch in said driving connection permitting the release of said conveyor and the bodily movement of said conveyor laterally from beneath said carriage.

19. A cut-off mechanism for a bar of plastic material, including a pair of traction rollers for gripping said bar to continuously advance the bar at a uniform rate, a carriage movable back and forth in the direction of travel of the bar, and having a support for the terminal portion of the bar, a cutter for intermittently cutting from the bar a terminal section resting upon said support, a drive shaft, means operated thereby for rotating said traction rollers, and means also operated therby for effecting back and forth movement of the carriage.

20. A cut-off mechanism for a bar of plastic material, including a pair of traction rollers for gripping said bar to continuously advance the bar at a uniform rate, a carriage movable back and forth in the direction of travel of the bar, and having a support for the terminal portion of the bar, a cutter for intermittently cutting from the bar a terminal section resting upon said support, a drive shaft, means operated thereby for rotating said traction rollers, means also operated thereby for effecting back and forth movement of the carriage, and means for intermittently operating said support to drop therefrom the cut off section.

PAUL PHELPS.
JOHN HOHL.